United States Patent
Kalker et al.

(10) Patent No.: US 6,477,431 B1
(45) Date of Patent: Nov. 5, 2002

(54) WATERMARK DETECTION

(75) Inventors: Antonius A. C. M. Kalker, Eindhoven (NL); Jaap A. Haitsma, Eindhoven (NL); Maurice J. J. J.-B Maes, Eindhoven (NL); Geert F. G. Depovere, Eindhoven (NL); Johan P. M. G. Linnartz, Eindhoven (NL)

(73) Assignee: Koninklijke Phillips Electronics, NV, Eindhoven (NL)

( * ) Notice: Subject to any disclaimer, the term of this patent is extended or adjusted under 35 U.S.C. 154(b) by 0 days.

(21) Appl. No.: 09/423,276

(22) PCT Filed: Mar. 2, 1999

(86) PCT No.: PCT/IB99/00358
§ 371 (c)(1),
(2), (4) Date: Nov. 4, 1999

(87) PCT Pub. No.: WO99/45706
PCT Pub. Date: Sep. 10, 1999

(30) Foreign Application Priority Data

Mar. 4, 1998 (EP) ............................................. 98200656

(51) Int. Cl.⁷ ............................................. G05B 13/02
(52) U.S. Cl. ............................. 700/39; 700/26; 700/27; 700/30; 700/38; 700/52; 700/58; 382/135; 382/212; 382/232; 382/235; 382/251; 382/181; 713/176; 713/179; 713/200; 380/54; 380/201; 380/206; 380/239
(58) Field of Search ............................. 700/26, 27, 30, 700/32, 38, 39, 52, 58; 382/100, 135, 212, 251, 232, 235, 237, 181, 276; 713/176, 179, 200; 380/54, 201–206, 239

(56) References Cited

U.S. PATENT DOCUMENTS

| | | | | |
|---|---|---|---|---|
| 4,669,344 A | * | 6/1987 | Herrig | .......................... 400/621 |
| 5,960,081 A | * | 9/1999 | Vynne et al. | ................. 348/461 |
| 6,198,832 B1 | * | 3/2001 | Maes et al. | ..................... 380/54 |
| 6,246,775 B1 | * | 6/2001 | Nakamura et al. | ........... 382/100 |
| 6,252,972 B1 | * | 6/2001 | Linnartz | ...................... 382/100 |
| 6,341,350 B1 | * | 1/2002 | Miyahara et al. | ............ 713/176 |

FOREIGN PATENT DOCUMENTS

| | | | | |
|---|---|---|---|---|
| WO | WO9803014 | | 6/1997 | ............ H04N/7/08 |
| WO | WO-99/12347 | * | 3/1999 | ........... H04N/5/913 |

OTHER PUBLICATIONS

US 2002/0009208 A1, Alattar et al., Jan. 24, 2002, Authentication of Physical and Electronic Media Objects Using Digital Watermarks.*

US 2002/0015509 A1, Nakamura et al., Feb. 7, 2002, Method and Apparatus for Superposing a Digital Watermark and Method and Apparatus for Detecting a Digital Watermark.*

* cited by examiner

*Primary Examiner*—Ramesh Patel
(74) *Attorney, Agent, or Firm*—Gregory L. Thorne

(57) ABSTRACT

A method and arrangement for detecting a watermark in an information signal. The method may include the steps of computing the correlation ($d_k$) of the watermark ($W_i$) and the information signal (e.g. an image Q) for a plurality of positions (k) of the watermark with respect to the information signal, and detecting whether at least one of the respective correlation values exceeds a given threshold. The step of detecting may include determining the standard deviation ($\sigma_d$) of the respective correlation values ($d_k$), and setting the threshold to a given multiple (T) of the standard deviation. The multiple (T) is derived form a desired false alarm rate (watermark detected when there is none, or no watermark detected when there is one).

12 Claims, 5 Drawing Sheets

WATERMARK DETECTION

FIELD OF THE INVENTION

The invention relates to a method of detecting a watermark in an information signal that has possibly been watermarked by modifying values of said information signal in accordance with (temporally or spatially) corresponding values of a watermark pattern. The invention also relates to an arrangement for detecting a watermark.

BACKGROUND OF THE INVENTION

A prior art method as defined in the opening paragraph is disclosed in International Patent Application WO-A-98/03014. The watermark is detected by computing the correlation of the suspect information signal with an applied watermark pattern, and comparing the correlation with a predetermined threshold. If the correlation is larger than the threshold, the watermark is said to be present, otherwise it is said to be absent.

OBJECT AND SUMMARY OF THE INVENTION

It is an object of the invention to provide a suitable criterion for setting the threshold.

To this end, the invention provides a method of detecting a given watermark in an information signal, comprising the steps of: computing the correlation of said watermark and said information signal for a plurality of positions of said watermark with respect to said information signal; and detecting whether at least one of the respective correlation values exceeds a given threshold; characterized in that the method comprises the step of determining the standard deviation of the respective correlation values, wherein said given threshold is a given multiple of said standard deviation.

The invention exploits the insight that watermark detectors need to compute the correlation value for a plurality of (temporal or spatial) positions of the watermark with respect to the information signal (for example, an image) in practice, because the position of the watermark with respect to image is not absolutely known and/or information is embedded in shifts of one or more watermark patterns. The detection thus yields a series of correlation values, and it is the occurrence of relative peaks in such a series which is of interest rather than absolute correlation values.

DESCRIPTION OF PREFERRED EMBODIMENTS

For the sake of convenience, the watermarking scheme in accordance with the invention will be described as a system for attaching invisible labels to video contents but the teachings can obviously be applied to any other contents, including audio and multimedia. We will hereinafter often refer to this method as JAWS (Just Another Watermarking System).

Figure 1:
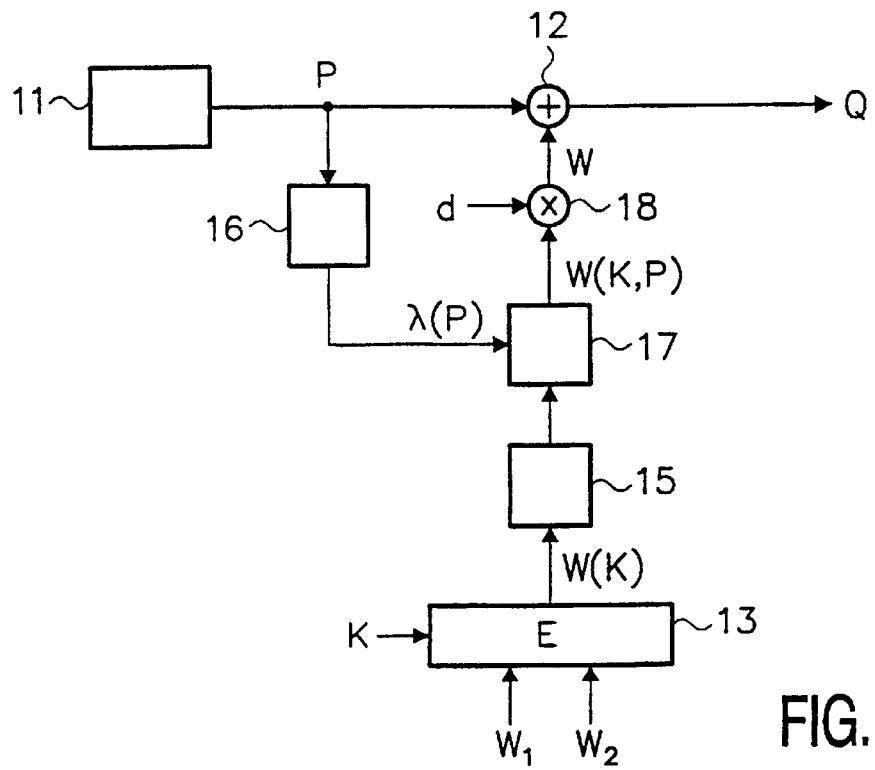
FIG. 1 shows schematically an arrangement for embedding a watermark in a signal.

FIG. 1 shows a practical embodiment of the watermark embedder to provide background information. The embedder comprises an image source 11 which generates an image P, and an adder 12 which adds a watermark W to the image P. The watermark W is a noise pattern having the same size as the image, e.g. $N_1$ pixels horizontally and $N_2$ pixels vertically. The watermark W represents a key K, i.e. a multi-bit code which is to be retrieved at the receiving end.

Figure 2:
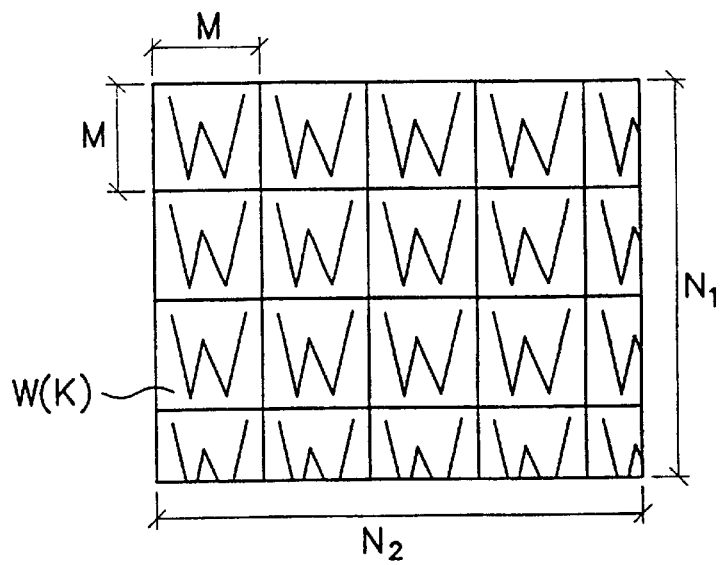
FIGS. 2 and 3 show diagrams to illustrate the operation of the embedder which is shown in FIG. 1.

To avoid that the watermark detection process needs to search the watermark W over the large $N_1 \times N_2$ space, the watermark is generated by repeating, and if necessary truncating, smaller units called "tiles" W(K) over the extent of the image. This "tiling" operation (15) is illustrated in FIG. 2. The tiles W(K) have a fixed size M×M. The tile size M should not be too small: smaller M implies more symmetry in W(K) and therefore a larger security risk. On the other hand M should not be too large: a large value of M implies a large search space for the detector and therefore a large complexity. In JAWS we have chosen M=128 as a reasonable compromise.

Then, a local depth map or visibility mask $\lambda(P)$ is computed (16). At each pixel position, $\lambda(P)$ provides a measure for the visibility of additive noise. The map $\lambda(P)$ is constructed to have an average value equal to 1. The extended sequence W(K) is subsequently modulated (17) with $\lambda(P)$, i.e. the value of the tiled watermark W(K) at each position is multiplied by the visibility value of $\lambda(P)$ at that position. The resulting noise sequence W(K,P) is therefore dependent on both the key K and the image content of P. We refer to W(K,P) as an adaptive watermark as it adapts to the image P.

Finally, the strength of the final watermark is determined by a global depth parameter d which provides a global scaling (18) of W(K,P). A large value of d corresponds to a robust but possibly visible watermark. A small value corresponds to an almost imperceptible but weak watermark. The actual choice of d will be a compromise between the robustness and perceptibility requirements. The watermarked image Q is obtained by adding (12) W=d×W(K,P) to P, rounding to integer pixel values and clipping to the allowed pixel value range.

Figure 3:
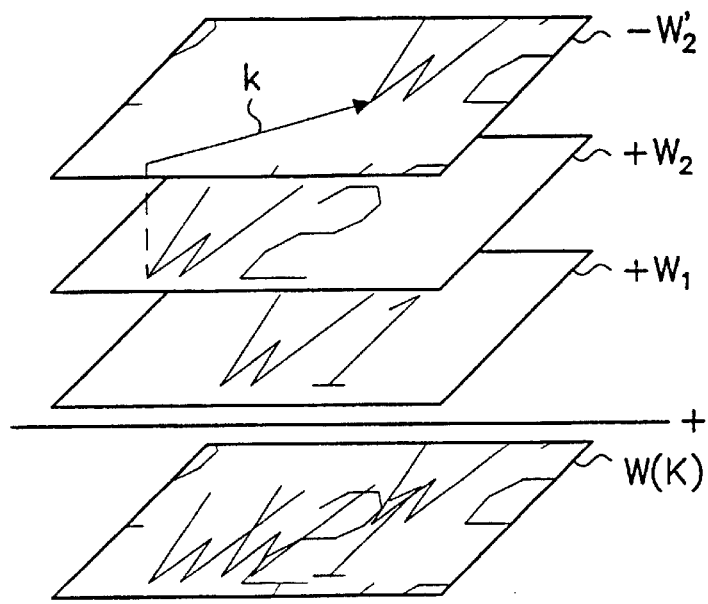

In order to embed the multi-bit code K in the watermark W, every tile W(K) is built up from a limited set of uncorrelated basic or primitive tiles $\{W_1 \ldots W_n\}$ and shifted versions thereof, in accordance with $$W(K) = \sum_{i,j} s_{i,j} \text{shift}(W_i, k_{i,j})$$

where "shift($W_i$, $k_{i,j}$)" represents a spatial shift of a basic M*M tile $W_i$ over a vector $k_{i,j}$ with cyclic wrap around. The signs $s \in \{-1,+1\}$ and the shifts k depend on the key K via an encoding function E (13). It is the task of the detector to reconstruct K after retrieving the signs $s_i$ and the shifts $k_i$. Note that each basic tile $W_i$ may occur several times. In FIG. 1, the encoder 13 generates W(K)=$W_1$+$W_2$−$W_2'$ where $W_2'$ is a shifted version of $W_2$. FIG. 3 illustrates this operation.

Figure 4:
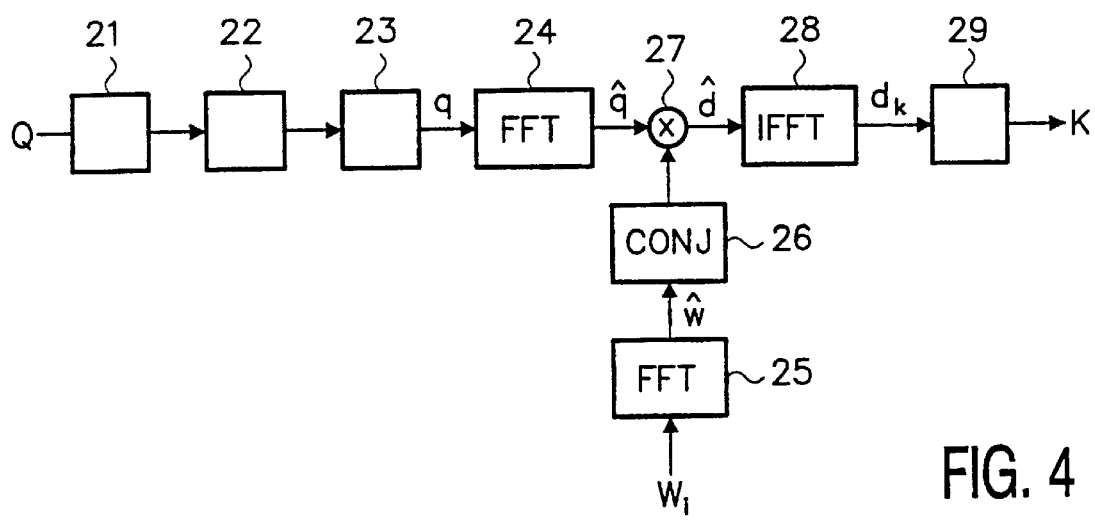
FIG. 4 shows schematically an arrangement for detecting the embedded watermark.
Figure 5:
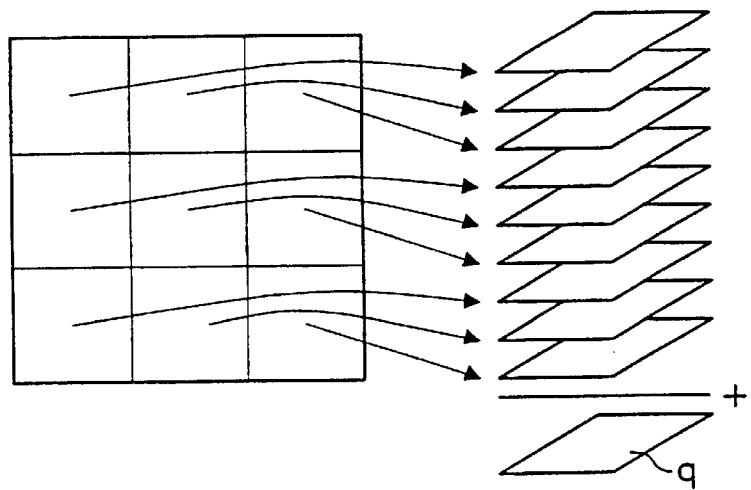
FIGS. 5, 6A and 6B show diagrams to illustrate the operation of the detector which is shown in FIG. 4.

FIG. 4 shows a schematic diagram of the watermark detector in accordance with the invention. The watermark detector receives possibly watermarked images Q. Watermark detection in JAWS is not done for every single frame, but for groups of frames. By accumulating (21) a number of frames the statistics of detection is improved and therefore also the reliability of detection. The accumulated frames are subsequently partitioned (22) into blocks of size M×M (M=128) and all the blocks are stacked (23) in a buffer q of size M×M. This operation is known as folding. FIG. 5 illustrates this operation of folding.

The next step in the detection process is to assert the presence in buffer q of a particular noise pattern. To detect whether or not the buffer q includes a particular watermark pattern W, the buffer contents and said watermark pattern are subjected to correlation. Computing the correlation of a suspect information signal q with a watermark pattern w comprises computing the inner product d=<q,w> of the information signal values and the corresponding values of the watermark pattern. For a one-dimensional information signal q={$q_n$} and watermark pattern W={$W_n$}, this can be written in mathematical notation as:

$$d = \frac{1}{N}\sum_{n=1}^{N} q_n w_n,$$

For the two-dimensional M×M image q={$q_{ij}$} and watermark pattern W={$w_{ij}$}, the inner product is:

$$d = \frac{1}{M^2}\sum_{i=1}^{M}\sum_{j=1}^{M} q_{ij} w_{ij}.$$

In principle, the vector $k_i$ by which a tile $W_i$ has been shifted can be found by successively applying $W_i$ with different vectors k to the detector, and determining for which k the correlation is maximal. However, this brute force searching algorithm is time consuming. Moreover, the image Q may have undergone various forms of processing (such as translation or cropping) prior to the watermark detection, so that the detector does not know the spatial location of the basic watermark pattern $W_i$ with respect to the image Q.

Instead of brute force searching JAWS exploits the structure of the patterns W(K). The buffer q is examined for the presence of these primitive patterns, their signs and shifts. The correlation $d_k$ of an image q and a primitive pattern w being shifted by a vector k ($k_x$ pixels horizontally and $k_y$ pixels vertically is:

$$d_k = \frac{1}{M^2}\sum_{i=1}^{M}\sum_{j=1}^{M} q_{ij} w_{i+k_x, j+k_y}.$$

The correlation values $d_k$ for all possible shift vectors k of a basic pattern $W_i$ are simultaneously computed using the Fast Fourier transform. As shown in FIG. 4, both the contents of buffer q and the basic watermark pattern $W_i$ are subjected to a Fast Fourier Transform (FFT) in transform circuits 24 and 25, respectively. These operations yield:

$$\hat{q}=FFT(q)$$

and $$\hat{w}=FFT(w),$$

where $\hat{q}$ and $\hat{w}$ are sets of complex numbers.

Computing the correlation is similar to computing the convolution of q and the conjugate of $W_i$. In the transform domain, this corresponds to:

$$\hat{d}=\hat{q}\otimes \text{conj}(\hat{w})$$

where the symbol $\otimes$ denotes pointwise multiplication and conj( ) denotes inverting the sign of the imaginary part of the argument. In FIG. 4, the conjugation of $\hat{w}$ is carried out by a conjugation circuit 26, and the pointwise multiplication is carried out by a multiplier 27. The set of correlation values d={$d_k$} is now obtained by inverse Fourier transforming the result of said multiplication:

$$d=IFFT(\hat{d})$$

which is carried out in FIG. 4 by an inverse FFT circuit 28. The watermark pattern $W_i$ is detected to be present if a correlation value $d_k$ is larger than a given threshold.

Figure 6A:
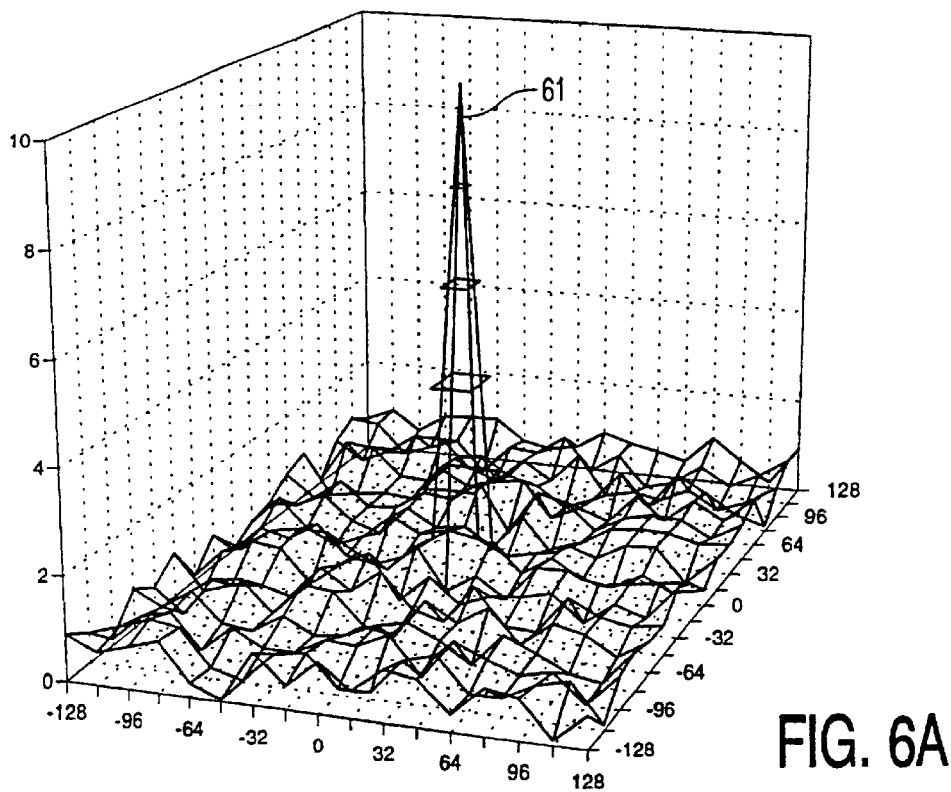
Figure 6B:
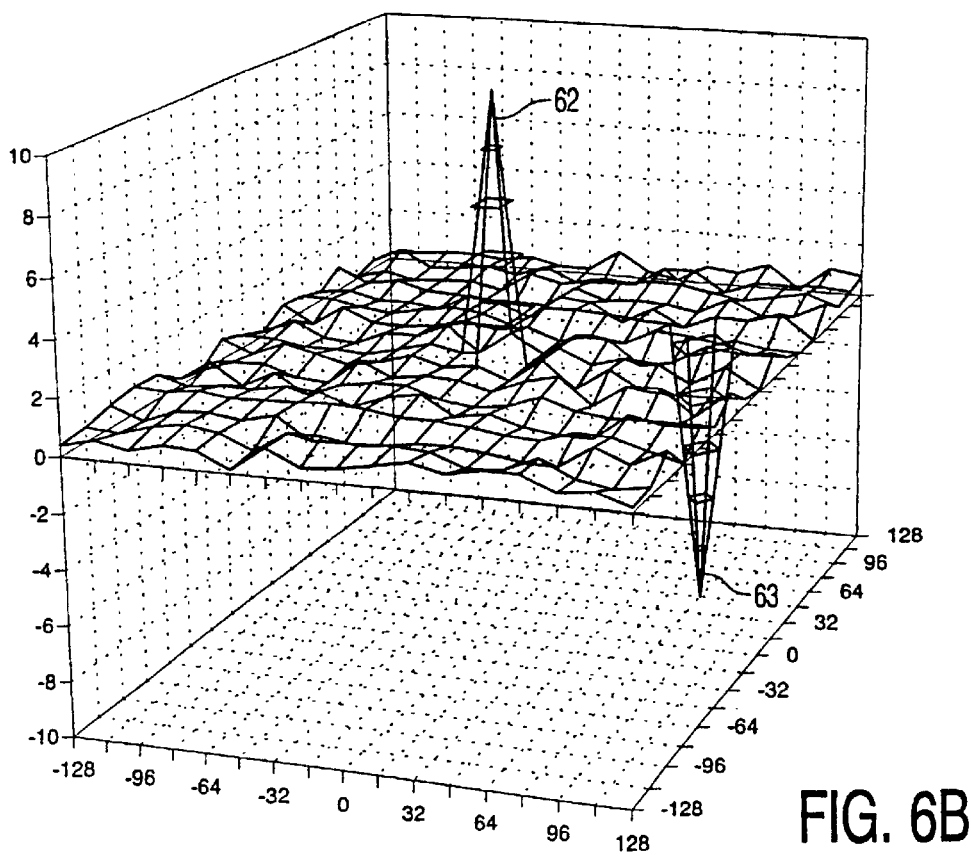

FIG. 6A shows a graph of correlation values $d_k$ if the presence of watermark pattern $W_1$ (see FIGS. 1 and 3) in image Q is being checked. The peak 61 indicates that $W_1$ is indeed found. The position (0,0) of this peak indicates that the pattern $W_1$ applied to the detector happens to have the same spatial position with respect to the image Q as the pattern $W_1$ applied to the embedder. FIG. 6B shows the graph of correlation values if watermark pattern $W_2$ is applied to the detector. Two peaks are now found. The positive peak 62 at (0,0) denotes the presence of watermark $W_2$, the negative peak 63 at (48,80) denotes the presence of watermark $-W_2'$. The relative position of the latter peak 63 with respect to peak 62 (or, what is similar, peak 61) reveals the relative position (in pixels) of $W_2'$ with respect to $W_2$, i.e. the shift vector k. The embedded data K is derived from the vectors thus found.

Figure 7:
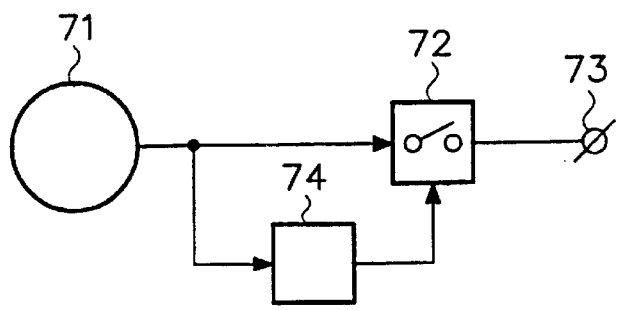
FIG. 7 shows a device for playing back a video bit stream with an embedded watermark.

The embedded information may identify, for example, the copy-right holder or a description of the content. In DVD copy-protection, it allows material to be labeled as 'copy once', 'never copy', 'no restriction', 'copy no more', etc. FIG. 7 shows a DVD drive for playing back an MPEG bitstream which is recorded on a disc 71. The recorded signal is applied to an output terminal 73 via a switch 72. The output terminal is connected to an external MPEG decoder and display device (not shown). It is assumed that the DVD drive may not play back video signals with a predetermined embedded watermark, unless other conditions are fulfilled which are not relevant to the invention. For example, watermarked signals may only be played back if the disc 71 includes a given "wobble" key. In order to detect the watermark, the DVD drive comprises a watermark detector 74 as described above. The detector receives the recorded signal and controls the switch 72 in response to whether or not the watermark is detected.

Figure 8:
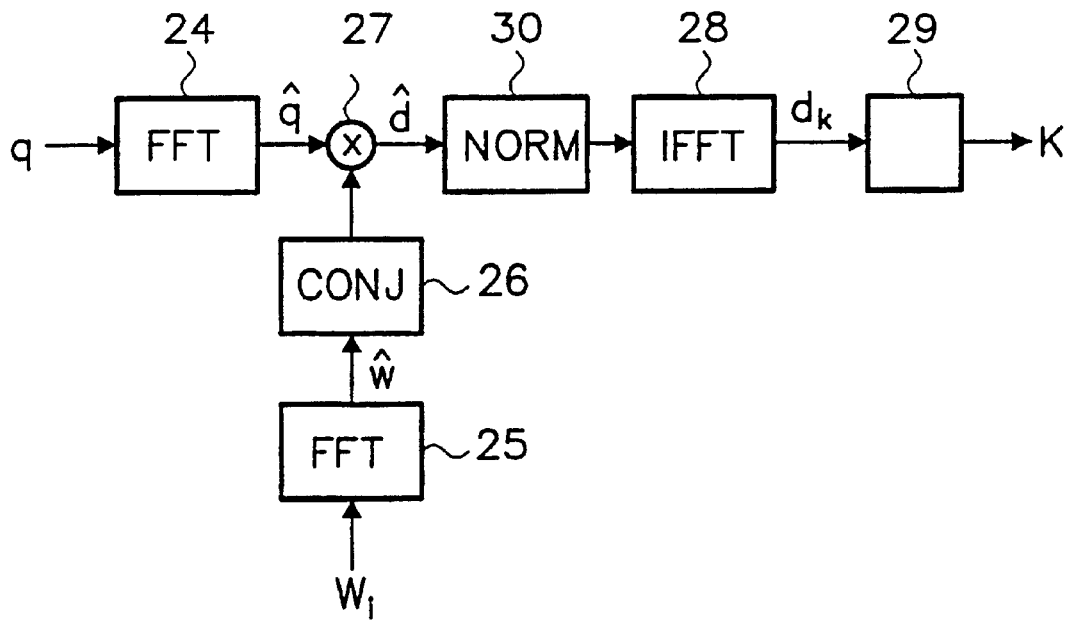
FIG. 8 shows schematically a preferred embodiment of the arrangement for detecting the embedded watermark.

The Fourier coefficients d are complex numbers, that is, they have a real part and an imaginary part, or a magnitude and a phase. The inventors have found that the reliability of the detector is significantly improved if the magnitude information is thrown away and the phase is considered only. FIG. 8 shows a preferred embodiment of the detector's correlation circuitry. The embodiment differs from the one shown in FIG. 4 in that a magnitude normalization circuit 30 has been inserted between the multiplier 27 and the inverse Fourier Transform circuit 28. The operation of the normalization circuit comprises pointwise dividing each coefficient by its magnitude. In mathematical notation:

$$\hat{d}:=\hat{d}\Phi abs(\hat{d}) \quad (1)$$

where $\Phi$ denotes pointwise division and abs( ) denotes:

$$abs(\hat{d}_k)=\sqrt{R(\hat{d}_k)^2+I(\hat{d}_k)^2} \quad (2)$$

where R( ) and I( ) denote the real and imaginary part of the argument, respectively.

Figure 9A:
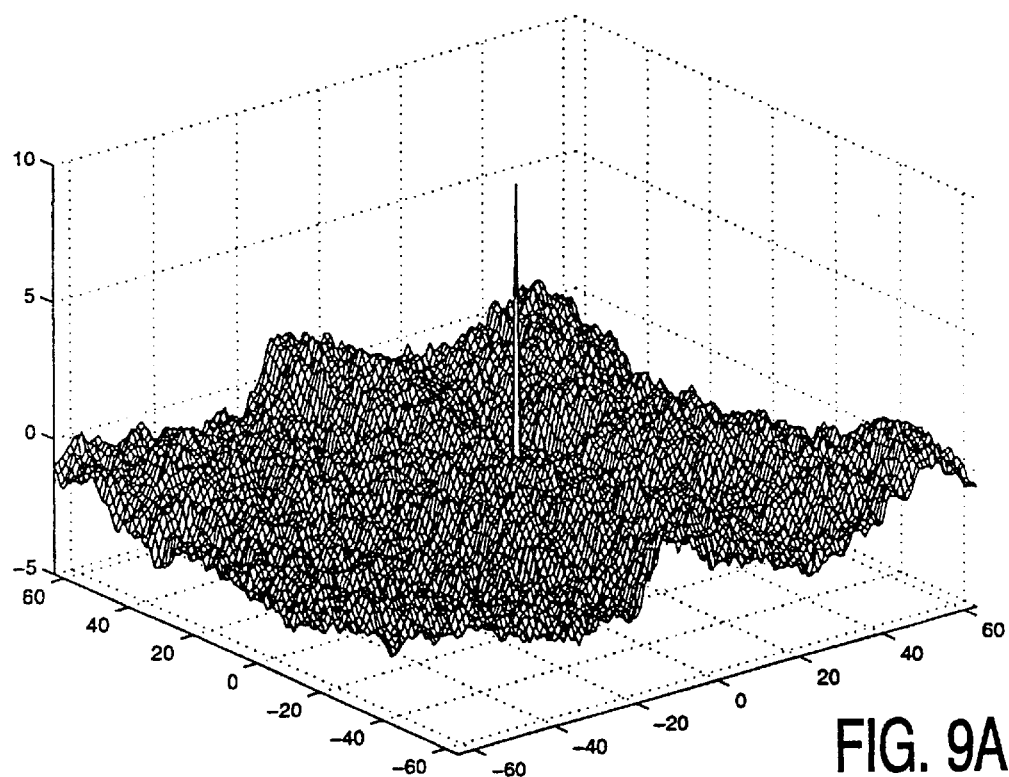
FIGS. 9A and 9B show diagrams to illustrate the operation of the detector which is shown in FIG. 8.
Figure 9B:
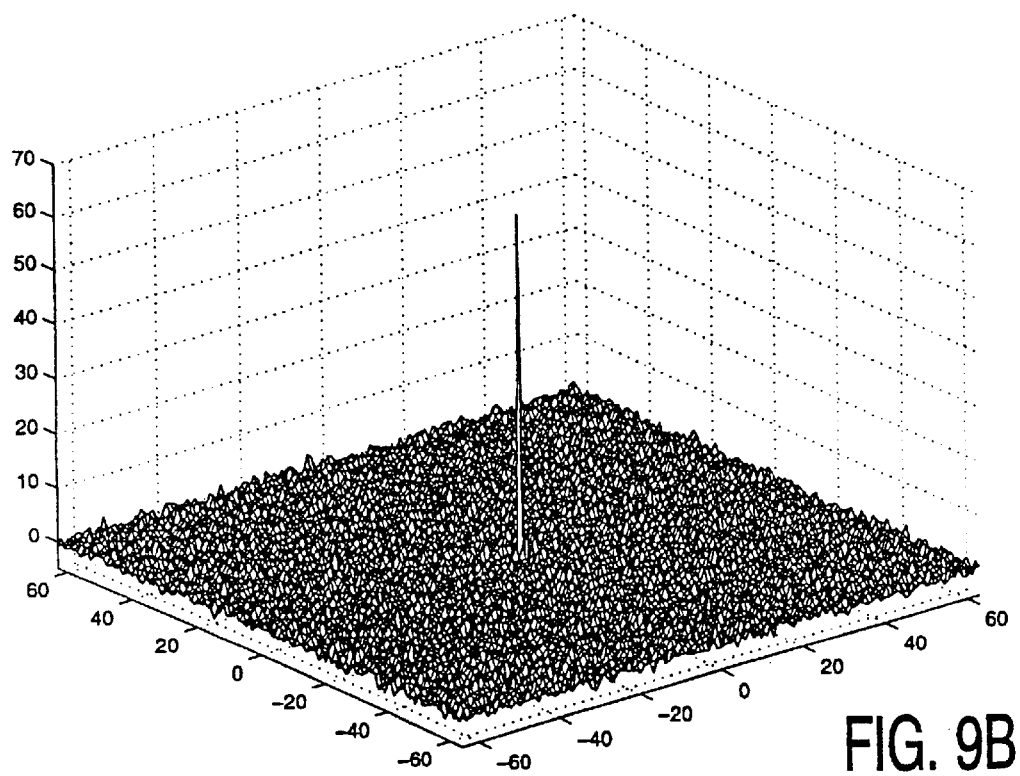

Said normalization of magnitudes is referred to as Symmetrical Phase Only Matched Filtering (SPOMF). FIGS. 9A and 9B illustrate the effect of SPOMF correlation. More particularly, FIG. 9A shows the correlation values $d_k$ when using linear correlation, i.e. without the magnitude normalization circuit 30. The correlation value $d_{00}$, expressed in units of standard deviation of the whole matrix, amounts to 9.79. FIG. 9B shows the correlation values when using SPOMF correlation. The correlation value $d_{00}$ is now 62.77 times the standard deviation. It will be appreciated that the peak in FIG. 9B can more reliably be detected than the peak in FIG. 9A.

Figure 10:
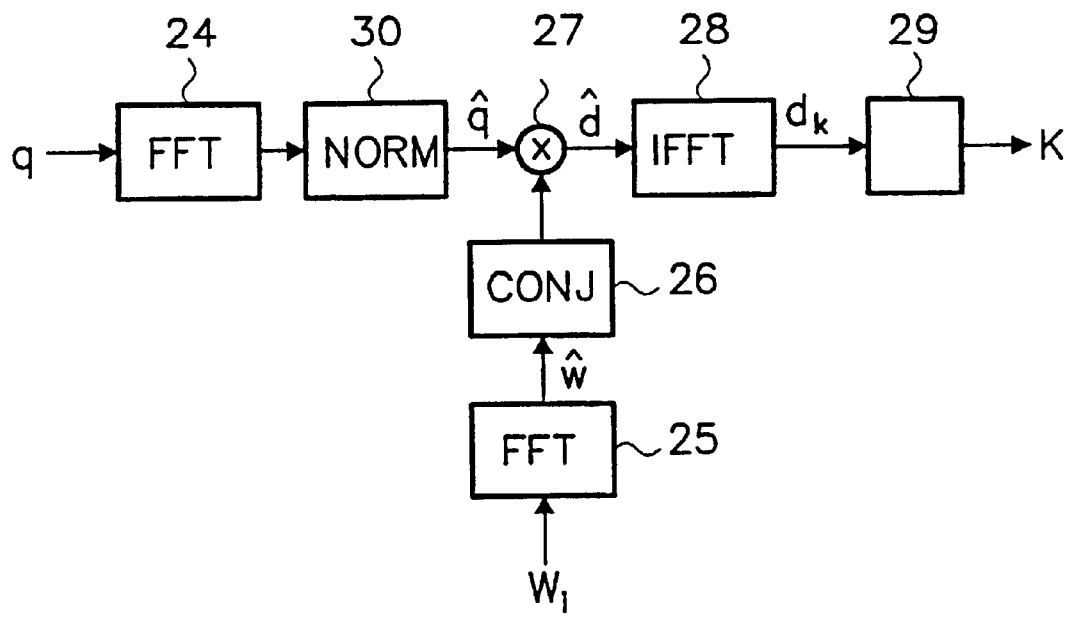
FIG. 10 shows schematically a further embodiment of the arrangement for detecting the embedded watermark.

Because normalizing the magnitudes of $\hat{d}$ is equivalent to normalizing the magnitudes of both $\hat{q}$ and $\hat{w}$, the normalization circuit 30 in FIG. 8 may be replaced by two normalization circuits after the FFT circuits 24 and 25. However, the embedded watermark will already have a reasonably white (flat) frequency spectrum because it is a pseudo-random noise pattern in practice, in which each sample is independently and identically drawn from a normal distribution. In view hereof, normalizing the magnitude of the information signal only has been found to suffice. FIG. 10 shows such an embodiment. The magnitude normalization circuit 30 is now located between the FFT circuit 24 and the multiplier 27. In this embodiment, the magnitudes of $\hat{d}$ are not exactly, but substantially, the same.

It should further be noted that the FFT and the conjugation of the applied watermark $W_1$ (c.f. circuits 25 and 26, respectively, in FIGS. 4, 8 and 10), as well as the optional normalization of the magnitudes of $\hat{w}$, can be pre-computed and stored in a memory.

This invention addresses the aspect of determining criteria for correlation values $d_k$ to be peaks. To this end we consider the decision variable $d_k$ as a stochastic variable. A way of formulating "largeness" of $d_k$ is by comparison to the standard deviation $\sigma_d$ of d. If a particular measurement $d_k$ is larger than $T\sigma_d$ for some suitably chosen threshold T, then we say that $d_k$ is an statistical outlier. This will be interpreted as the presence of a watermark.

Experiments have shown that d can be modeled to a very good approximation as a normal distribution. This holds both for linear correlations as well as for SPOMF correlations. This allows us to associate false positive rates to the threshold T. In particular the probability that a measurement $d_k$ is larger than $T\sigma_d$ can be computed as erfc(T), where erfc is the error function $$erfc(T) = \frac{1}{2\pi} \int_T^\infty e^{\frac{-x^2}{2}} dx$$

A threshold value T=5 is generally considered to be safe and corresponds with a false alarm probability of $2.8\times10^{-7}$.

Each of the values $d_k$ can be seen as the correlation of a fixed watermark $\{w_j\}$ with an image $q^k$, where $q^k$ is a shifted version of q (with cyclic wrap around). Therefore we can view the matrix $d_k$ as a matrix of instantiations of the stochastic process d. Experiments have shown that d can be modeled to a very good approximation as a normal distribution. This holds both for linear correlations as well as for SPOMF correlations. This allows us to associate false positive rates to the threshold T. In particular the probability that a measurement $d_k$ is larger than $T\sigma_d$ can be computed as erfc(T), where erfc is the error function $$erfc(T) = \frac{1}{2\pi} \int_T^\infty e^{\frac{-x^2}{2}} dx$$

A threshold value T=5 is generally considered to be safe and corresponds with a false alarm probability of $2.8\times10^{-7}$. The actual false alarm rate is orders of magnitudes lower due to the way watermark information K is encoded as a combination of signs and peak positions. The probability that for T=5 a legal combination of peaks and signs occurs by chance is vanishingly small.

The actual false alarm rate is orders of magnitudes lower due to the way watermark information K is encoded as a combination of signs and peak positions. The probability that for T=5 a legal combination of peaks and signs occurs by chance is vanishingly small.

For linear correlations as described above, it can be shown that $\sigma_d$ can be directly expressed in terms of the standard deviation $\sigma_q$ of the image q and the standard deviation $\sigma_w$ of the watermark w:

$$\sigma_d \approx \frac{1}{M} \sigma_q \sigma_w$$

In practice, this implies that $\sigma_d$ may be assumed to have a fixed predetermined value.

The value of $\sigma_d$ can also be estimated directly from the matrix $\{d_k\}$, viz.

$$\sigma_d \approx \sqrt{\frac{1}{M^2} \sum_k d_k^2}$$

The latter method of computing $\sigma_d$ is particularly useful when the correlation values are computed using SPOMF because for SPOMF correlation there are no easy theoretical formulas for $\sigma_d$. With SPOMF detection, peak heights in $\{d_k\}$ are compared with this measured standard deviation and judged relevant if larger than $5\sigma_d$.

In summary, a method and arrangement for detecting a watermark in an information signal is disclosed. The method comprises the steps of computing (24–28,30) the correlation ($d_k$) of said watermark ($W_i$) and said information signal (e.g. an image Q) for a plurality of positions (k) of said watermark with respect to said information signal, and detecting (29) whether at least one of the respective correlation values exceeds a given threshold. The step of detecting (29) comprises determining the standard deviation ($\sigma_d$) of the respective correlation values ($d_k$), and setting the threshold to a given multiple (T) of said standard deviation. The multiple (T) is derived form a desired false alarm rate (watermark detected when there is none, or no watermark detected when there is one).

What is claimed is:

1. A method of detecting a given watermark (w) in an information signal (q), comprising the steps of:

computing a correlation ($d_k$) of said watermark and said information signal for a plurality of positions (k) of said watermark with respect to said information signal;

detecting whether at least one of the respective correlation values exceeds a given threshold; and determining the standard deviation ($\sigma_d$) of the respective correlation values ($d_k$), wherein said given threshold is a given multiple (T) of said standard deviation.

2. A method as claimed in claim 1, comprising the step of computing said standard deviation ($\sigma_d$) from the correlation values ($d_k$) in accordance with $$\sigma_d \approx \sqrt{\frac{1}{G}\sum_k d_k^2}$$

where G is the number of correlation values.

3. A method as claimed in claim 1, wherein said standard deviation is assumed to have a predetermined fixed value.

4. A method as claimed in claim 1, wherein said multiple (T) is derived from a desired false detection probability p in accordance with p=erfc(T), where erfc(T) is the error function $$erfc(T) = \frac{1}{\sqrt{2\pi}} \int_T^\infty e^{\frac{-x^2}{2}} dx.$$

5. An arrangement for detecting a given watermark (w) in an information signal (q), comprising:
  means for computing the correlation ($d_k$) of said watermark and said information signal for a plurality of positions (k) of said watermark with respect to said information signal;
  means for detecting whether at least one of the respective correlation values exceeds a given threshold; and
  means for determining the standard deviation ($\sigma_d$) of the respective correlation values ($d_k$), wherein said given threshold is a given multiple (T) of said standard deviation.

6. An arrangement as claimed in claim 5, comprising:
  means for computing said standard deviation ($\sigma_d$) from the correlation values ($d_k$) in accordance with $$\sigma_d \approx \sqrt{\frac{1}{G}\sum_k d_k^2}$$

where G is the number of correlation values.

7. An arrangement as claimed in claim 5, wherein said standard deviation has a predetermined value.

8. An arrangement as claimed in claim 5, wherein said multiple (T) is derived from a desired false detection probability p in accordance with p=erfc(T), where erfc(T) is the error function $$erfc(T) = \frac{1}{\sqrt{2\pi}} \int_T^\infty e^{\frac{-x^2}{2}} dx.$$

9. A detector for detecting a given watermark (w) in an information signal (q), the detector comprising:
  a first device configured to compute the correlation ($d_k$) of said watermark and said information signal for a plurality of positions (k) of said watermark with respect to said information signal;
  a threshold detector configured to detect if at least one of the respective correlation values exceeds a given threshold; and
  a second device configured to determine the standard deviation ($\sigma_d$) of the respective correlation values ($d_k$), wherein said given threshold is derived from said standard deviation.

10. A detector as claimed in claim 9, comprising a third device configured to compute said standard deviation ($\sigma_d$) from the correlation values ($d_k$) in accordance with $$\sigma_d \approx \sqrt{\frac{1}{G}\sum_k d_k^2}$$

where G is the number of correlation values.

11. A detector as claimed in claim 9, wherein said standard deviation has a predetermined value.

12. A detector as claimed in claim 9, wherein said multiple (T) is derived from a desired false detection probability p in accordance with p=erfc(T), where erfc(T) is the error function $$erfc(T) = \frac{1}{\sqrt{2\pi}} \int_T^\infty e^{\frac{-x^2}{2}} dx.$$

* * * * *